(12) United States Patent
Awalt et al.

(10) Patent No.: US 7,439,945 B1
(45) Date of Patent: Oct. 21, 2008

(54) LIGHT EMITTING DIODE DRIVER CIRCUIT WITH HIGH-SPEED PULSE WIDTH MODULATED CURRENT CONTROL

(75) Inventors: Thruston Awalt, Los Gatos, CA (US); Qi Deng, San Jose, CA (US)

(73) Assignee: Micrel, Incorporated, San Jose, CA (US)

( * ) Notice: Subject to any disclaimer, the term of this patent is extended or adjusted under 35 U.S.C. 154(b) by 0 days.

(21) Appl. No.: 11/865,702

(22) Filed: Oct. 1, 2007

(51) Int. Cl.
*G09G 3/32* (2006.01)
*H05B 41/16* (2006.01)
*H05B 41/36* (2006.01)

(52) U.S. Cl. ............... 345/83; 315/250; 315/294; 315/324

(58) Field of Classification Search ............ 315/209 R, 315/210, 246, 247, 250, 291, 294, 312, 324; 345/82, 83
See application file for complete search history.

(56) References Cited

U.S. PATENT DOCUMENTS

| | | | |
|---|---|---|---|
| 6,586,890 B2 | 7/2003 | Min et al. ............... 315/224 |
| 6,867,757 B1 * | 3/2005 | Nakamura ............... 345/83 |
| 7,317,403 B2 * | 1/2008 | Grootes et al. ......... 340/815.45 |
| 2007/0229001 A1 * | 10/2007 | McIntosh et al. ............ 315/307 |

\* cited by examiner

*Primary Examiner*—Thuy Vinh Tran
(74) *Attorney, Agent, or Firm*—Bever, Hoffman & Harms, LLP; Patrick T. Bever

(57) ABSTRACT

A Light-Emitting Diode (LED) driver circuit is disclosed that controls the brightness of light generated by a LED that is coupled between a first terminal and a second terminal in response to a user supplied brightness control signal. A constant current source generates a constant current that is supplied to the LED and to a shunt circuit, which his connected in parallel with the LED. A brightness control circuit generates a pulse signal having a duty cycle that is proportional to the brightness control signal, and controls the shunt circuit such that, when said pulse signal is high, the constant current is passed through the shunt circuit and the LED is turned off, and when the pulse signal is low, the constant current is passed through the LED. The duty cycle of the brightness control signal is adjusted to adjust the LED's brightness, while the LED color remains constant.

11 Claims, 3 Drawing Sheets

US 7,439,945 B1

LIGHT EMITTING DIODE DRIVER CIRCUIT WITH HIGH-SPEED PULSE WIDTH MODULATED CURRENT CONTROL

FIELD OF THE INVENTION

The technology described herein is generally related to the field of integrated circuits and, more particularly, to driver circuits for light emitting diodes ("LEDs").

BACKGROUND OF THE INVENTION

LEDs are known to act as a source of emitted light for a wide variety of applications. LEDs are known to provide many advantages over incandescent and fluorescent illumination because of their long operating life, high efficiency, lightweight, and low profile.

FIG. 4 is a schematic diagram illustrating a conventional LED display including an LED driver circuit 50 for driving an LED chain 52 made up of serial connected LEDs 53-1 to 53-N. LED driver circuit 50 includes a DC-DC boost converter 51 that is utilized in conjunction with a passive inductor $L_{EXT}$ and a passive discharge capacitor $C_{EXT}$. DC-DC boost converter 51 includes a comparator (operational amplifier) 55, a pulse width modulation ("PWM") circuit 58, an internal capacitor $C_{INT}$, an npn bipolar transistor $T_1$ and a zener diode $S_1$. An external voltage (VIN) is supplied, for example, from a battery, to the anode of diode $S_1$ and to the collector of transistor $T_1$ by way of inductor $L_{EXT}$. The voltage level at the output node 54, which is connected to a first end of the LED chain 52, is established by a user supplied reference voltage "$V_{REF}$" applied to the input terminal (node 57) that is connected to the inverting input terminal of comparator 105, also sometimes referred to in the art as the "error amplifier". The second end of LED chain 52 is connected to the non-inverting input terminal of comparator 55, which is also connected to ground by way of an appropriately sized external resistor "$R_{EXT}$" 56. The output voltage at node 54 adjusts until the loop through boost converter 51 controls the current passing through LED chain 52 such that the current is defined as $I=V_{REF}/R_{EXT}$, where $V_{REF}$ is a regulated voltage powered from $V_{IN}$. Light output from LED chain 52 is proportional to the current generated by LED driver 50, and can therefore be selectively increased by way of increasing the current generated by LED driver circuit 50. LED driver circuits similar to those shown in FIG. 4 are used in commercial products such as the Model 2287 integrated circuit manufactured by the assignee of the present application, that drive LED chains such that current feedback substantially constantly adjusts the power to the LED chain (see also, e.g., Min et al., U.S. Pat. No. 6,586,890, which is incorporated herein by reference in its entirety).

LEDs have two key characteristics: color and brightness. In LED lighting applications it is often desirable to change the brightness of the light emitted while maintaining a fixed color. Because the color and brightness are both controlled by the current passing through the LED, the desire to change brightness conflicts with producing a fixed color. Designers can circumvent this problem by maintaining a constant current through the LED and turning it ON/OFF very quickly using a PWM circuit, such as that depicted in FIG. 4. By changing the ratio of ON time to OFF time, while keeping the same pulse repetition rate, the perception of varying brightness can be achieved. When PWM ON/OFF control is used, the pulse repetition rate is called PWM frequency, and the ratio of ON time to the pulse repetition period is called duty cycle.

The human eye's ability to average or smooth this stream of light pulses into what appears to be a steady light depends upon the rate at which the LED switches ON/OFF. The shorter the time between light pulses, the more constant and unwavering the light appears to be. To achieve a wide range of brightness control, the minimum duty cycle will typically be 1%. Also, to avoid the perception of flicker (being able to detect the individual pulses), the PWM frequency should ideally be 1 kHz or greater. This pulse width shrinks more as either the PWM frequency or the duty cycle is increased. Because a typical circuit that is used to control current or voltage has a finite response time, the combination of high PWM frequency and low duty cycle can go beyond its ability to keep the current (or voltage) constant. This means that, the higher the frequency and the lower the duty cycle of the PWM control signal, the harder to adjust a LED's brightness while keeping its color constant.

What is needed is a LED driver circuit that avoids the brightness/color problems associated with conventional LED driver circuits.

SUMMARY OF THE INVENTION

The present invention avoids the brightness/color problems of conventional LED driver circuits by generating a constant current, and then switching the constant current between an externally connected LED (or strings of LEDs) and an alternate path that bypasses the LEDs. In a simplified embodiment the switching operation is performed by a shunt transistor that is connected in parallel with the LED(s), and a pulse width modulation (PWM) circuit that controls the shunt circuit in accordance with an externally (user) supplied brightness control signal. The PWM circuit converts the brightness control signal into a pulse signal having a predetermined PWM frequency (e.g., 1 kHz or greater) and a duty cycle that is proportional (i.e., either directly or inversely) to the brightness control signal. In one embodiment, when the pulse (e.g., square wave) signal generated by the PWM circuit is ON (e.g., high), the shunt transistor is turned on (closed) such that the constant current passes through the shunt transistor (i.e., bypasses the LEDs), whereby the opposing terminals of the LED(s) are maintained at a substantially constant voltage such that the LED(s) are completely turned off. Conversely, when the pulse signal is OFF (e.g., zero volts), the shunt transistor is turned off (opened) such that the constant current passes through the LED(s), whereby the LED(s) are turned on to emit light having a color determined by the constant current. The brightness of the LED(s) is controlled by adjusting the duty cycle of the PWM circuit (i.e., by adjusting the brightness control signal), while the color of the LED(s) remains constant due to the constant current. By redirecting the constant current to and away from the LED(s), taking advantage of the transistor's high switching speed to achieve short ON/OFF current pulses across the LED(s), the constant current control circuit does not need a fast response time or fast control loop.

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

The present invention relates to an improvement in LED displays. The following description is presented to enable one of ordinary skill in the art to make and use the invention as provided in the context of a particular application and its requirements. The terms "coupled" and "connected", which are utilized herein, are defined as follows. The term "connected" is used to describe a direct connection between two circuit elements, for example, by way of a metal line formed in accordance with normal integrated circuit fabrication techniques. In contrast, the term "coupled" is used to describe either a direct connection or an indirect connection between two circuit elements. For example, two coupled elements may be directly connected by way of a metal line, or indirectly connected by way of an intervening circuit element (e.g., a capacitor, resistor, inductor, or by way of the source/drain terminals of a transistor). Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
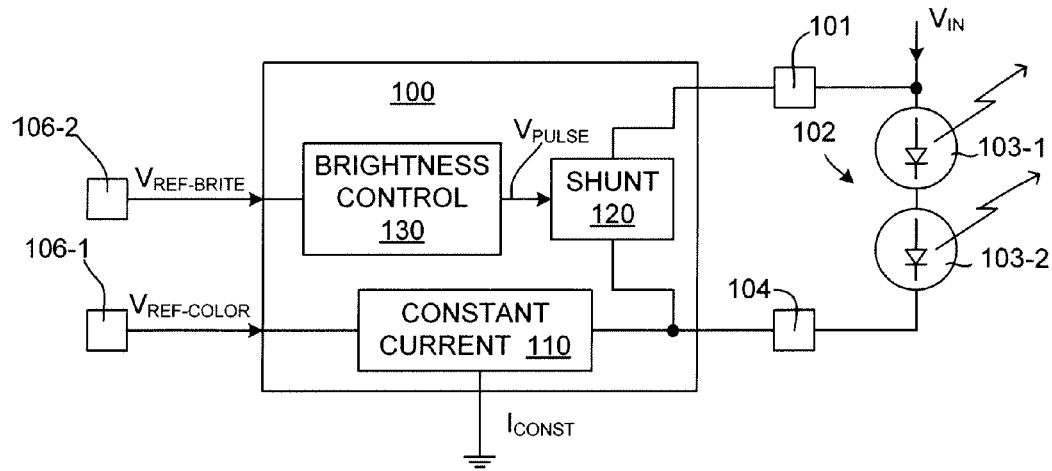
FIG. 1 is a simplified circuit diagram showing a LED display including an LED driver circuit according to a generalized embodiment of the present invention.

FIG. 1 is a simplified circuit diagram showing a LED driver circuit 100 for driving an external LED chain 102 that is connected between a first terminal 101 and a second terminal 104 according to a generalized embodiment of the present invention. LED chain 102 includes one or more serially connected LEDs (two exemplary LEDs, LED 103-1 and LED 103-2, are shown for illustrative purposes. LED driver circuit 100 generally includes a constant current source 110, a shunt circuit 120 and a brightness control circuit 130.

Constant current source 110 serves to generate a constant current $I_{CONST}$ between first terminal 101 and second terminal 104 when first terminal 101 is connected to an external voltage source $V_{IN}$ (e.g., a battery). In one embodiment, a magnitude of constant current source 110 is controlled by a color control signal $V_{REF-COLOR}$ that is supplied by a user by way of an input terminal 106-1, whereby the user is able to adjust the color of light emitted by LED chain 102 by adjusting the magnitude of constant current $I_{CONST}$. In an alternative embodiment externally-supplied color control signal $V_{REF-COLOR}$ may be omitted, but such an embodiment could limit the user's control over the color of light emitted by LED chain 102.

Shunt circuit 120 is connected between first terminal 101 and second terminal 104 (i.e., in parallel with LED chain 102 when LED chain 102 is connected to terminals 101 and 104). As described below, shunt circuit 120 operates in two states: a "closed" state in which constant current $I_{CONST}$ bypasses LED chain 102 (i.e., constant current $I_{CONST}$ passes through shunt circuit 120 between first terminal 101 and second terminal 103), and an "opened" state in which constant current $I_{CONST}$ passes through LED chain 102. In the "closed" state, first terminal 101 and second terminal 104 are maintained at a substantially common voltage, whereby LEDs 103-1 and 103-2 are prevented from generating visible light. In the "opened" state, LEDs 103-1 and 103-2 are caused to emit visible light having a color that is determined by a magnitude of constant current $I_{CONST}$. Shunt circuit 120 is described in the specific embodiments below as comprising a field-effect transistor, but may be implemented using a bipolar transistor or any another suitable high speed switching circuit structure known to those skilled in the art.

Brightness control circuit 130 serves to generate a pulse signal $V_{PULSE}$ having a duty cycle that is proportional to brightness control signal $V_{REF-BRITE}$, which is supplied by a user by way of an input terminal 106-2. As mentioned above, pulse signal $V_{PULSE}$ controls shunt circuit 120, and as such the duty cycle is determined by the specific switching circuit utilized to implement shunt circuit 120. For example, in one embodiment shunt circuit 120 "closes" when pulse signal $V_{PULSE}$ is at a (first) high voltage level, and shunt circuit 120 "opens" when pulse signal $V_{PULSE}$ is at a (second) low voltage level.

During operation, LED driver circuit 100 is connected to LED string 102 and an external voltage supply to form the LED display illustrated in FIG. 1. A user (not shown) applies brightness control signal $V_{REF-BRITE}$ to input terminal 106-2, and optional color control signal $V_{REF-COLOR}$ to input terminal 106-1. Brightness control circuit 130 converts the brightness control signal $V_{REF-BRITE}$ into a pulse signal $V_{PULSE}$ having a predetermined frequency (e.g., 1 kHz or greater) and a duty cycle that this proportional to the magnitude of brightness control signal $V_{REF-BRITE}$. As described above, when pulse signal $V_{PULSE}$ is ON (e.g., high), shunt circuit "closes" such that the constant current passes through shunt circuit 120 (i.e., bypasses LED string 102), and when pulse signal $V_{PULSE}$ is OFF (e.g., zero volts), shunt circuit 120 opens such that the constant current passes through LED string 102, whereby LEDs 103-1 and 103-2 are turned on to emit light having a color determined by constant current $I_{CONST}$. The brightness of light generated by LEDs 103-1 and 103-2 is controlled by adjusting the duty cycle of pulse signal $V_{PULSE}$ (i.e., by adjusting the magnitude of brightness control signal $V_{REF-BRITE}$), while the color of the light emitted by LEDs 103-1 and 103-2 remains constant due to constant current $I_{CONST}$. Therefore, the need for high speed operation of brightness control circuit 130 to avoid flickering of the light emitted by LEDs 103-1 and 103-2 is eliminated by using constant current $I_{CONST}$, whose current is constant magnitude and continuous in time, and redirecting constant current $I_{CONST}$ to periodically bypass the LEDs 103-1 and 103-2, thereby taking advantage of the high speed shunt circuit 120 to achieve short ON/OFF current pulses across LED chain 102.

Brightness control circuit 130 is described in the specific embodiments below as comprising a standard pulse-width modulation (PWM) circuit for generating a square-wave pulse signal $V_{PULSE}$. In alternative embodiments (not shown), brightness control circuit 130 may be implemented using any suitable circuit known to those skilled in the art that generates a periodic pulse signal similar to that described herein.

Figure 2:
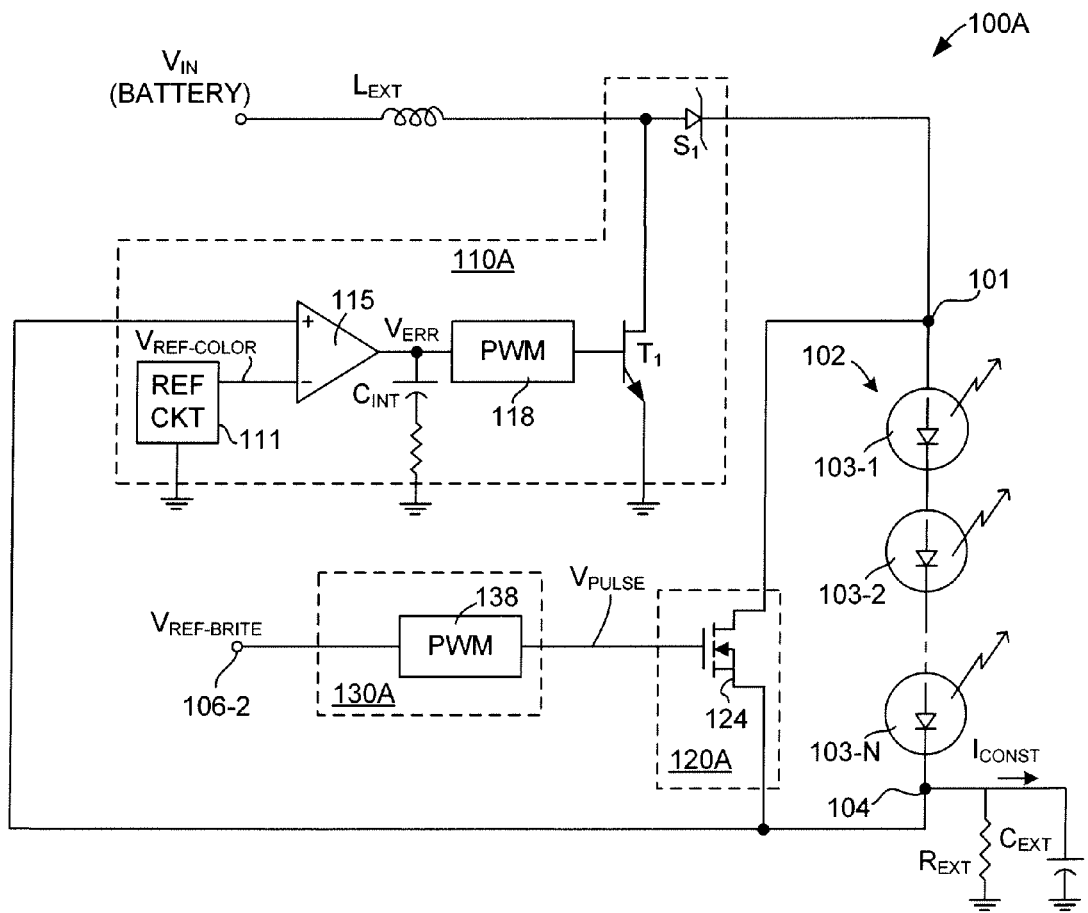
FIG. 2 is a simplified circuit diagram showing a LED driver circuit according to a specific embodiment of the present invention.

FIG. 2 is a simplified circuit diagram showing a LED driver circuit 100A including a constant current circuit 110A, a shunt circuit 120A and a brightness control circuit 130A according to a specific embodiment of the present invention. Constant current 110A includes a reference circuit (REF CKT) 111, a comparator (operational amplifier) 115, an internal capacitor $C_{INT}$, a first PWM 118, an npn bipolar transistor $T_1$ and a zener diode $S_1$ that are utilized in conjunction with an external sense resistor $R_{EXT}$, a passive inductor $L_{EXT}$ and a passive discharge capacitor $C_{EXT}$ to generate constant current $I_{CONST}$ that is supplied to terminal 101. Note that the signal generated at terminal 101 has sufficient voltage relative to terminal 104 (e.g., 2V or higher) to cause LED chain 102 to emit visible light. Note also that reference signal $V_{REF\text{-}BRITE}$ is referenced to supply voltage $V_{IN}$ using well-known techniques, and reference signal $V_{REF\text{-}BRITE}$ is generated by reference circuit 111. Those skilled in the art will recognize that many types of constant current circuits may be modified in accordance with the present invention to achieve the operations described herein. As such, the present invention is not intended to be limited by constant current circuit 110A unless specified in the appended claims.

In accordance with the specific embodiment shown in FIG. 2, shunt circuit 120A includes an N-channel Field Effect Transistor (FET) 124 having a first terminal connected to terminal 101, a second terminal connected to terminal 104, and a gate (control) terminal connected to receive pulse signal VPULSE from brightness control circuit 130A.

In addition, in accordance with the specific embodiment shown in FIG. 2, brightness control circuit 130A includes a pulse-width modulation (PWM) circuit 138 that generates a PWM signal in accordance with brightness control signal $V_{REF\text{-}BRIGHT}$. During operation in an exemplary embodiment, when brightness control signal $V_{REF\text{-}BRIGHT}$ remains relatively high, the duty cycle of PWM circuit 138 is low such that pulse signal $V_{PULSE}$ is "high" more often, which causes LEDs 103-1 to 103-2 to remain ON more often, which produces a brighter emitted LED light. Conversely, when brightness control signal $V_{REF\text{-}BRIGHT}$ is relatively low, the duty cycle of PWM circuit 138 is high such that pulse signal $V_{PULSE}$ is "high" less often, which causes LEDs 103-1 to 103-3 to remain ON less often, which produces a dimmer emitted LED light. Those skilled in the art understand that many digital circuits can generate PWM signals suitable for the purposes described herein, and therefore the present invention is not intended to be limited by any specific PWM circuit. Further, an inverter may be included in the $V_{PULSE}$ signal to invert the ON/OFF operation of shunt circuit 120A.

Figure 3:
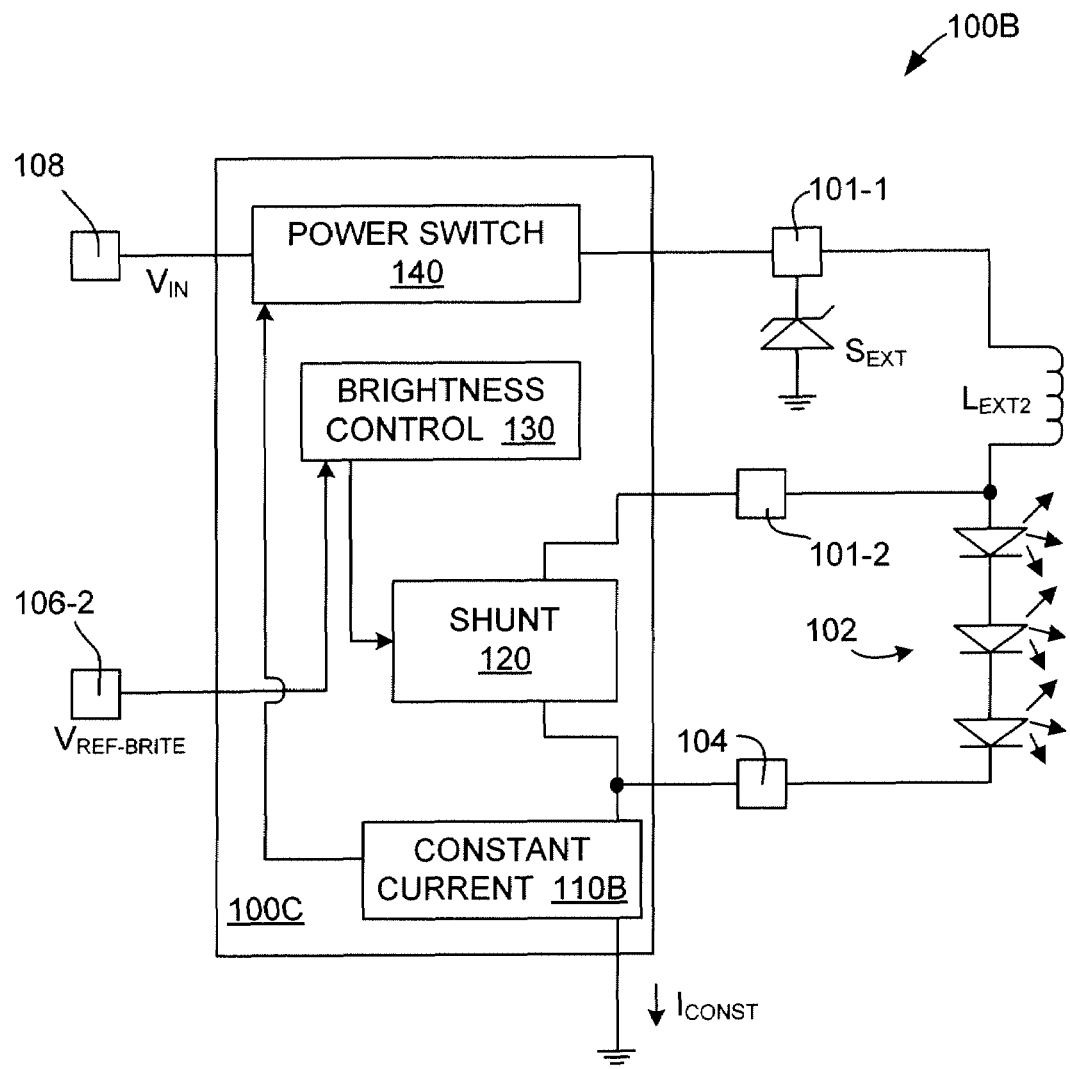
FIG. 3 is simplified circuit diagram showing a LED display including a LED driver circuit according to another generalized embodiment of the present invention.
Figure 4:
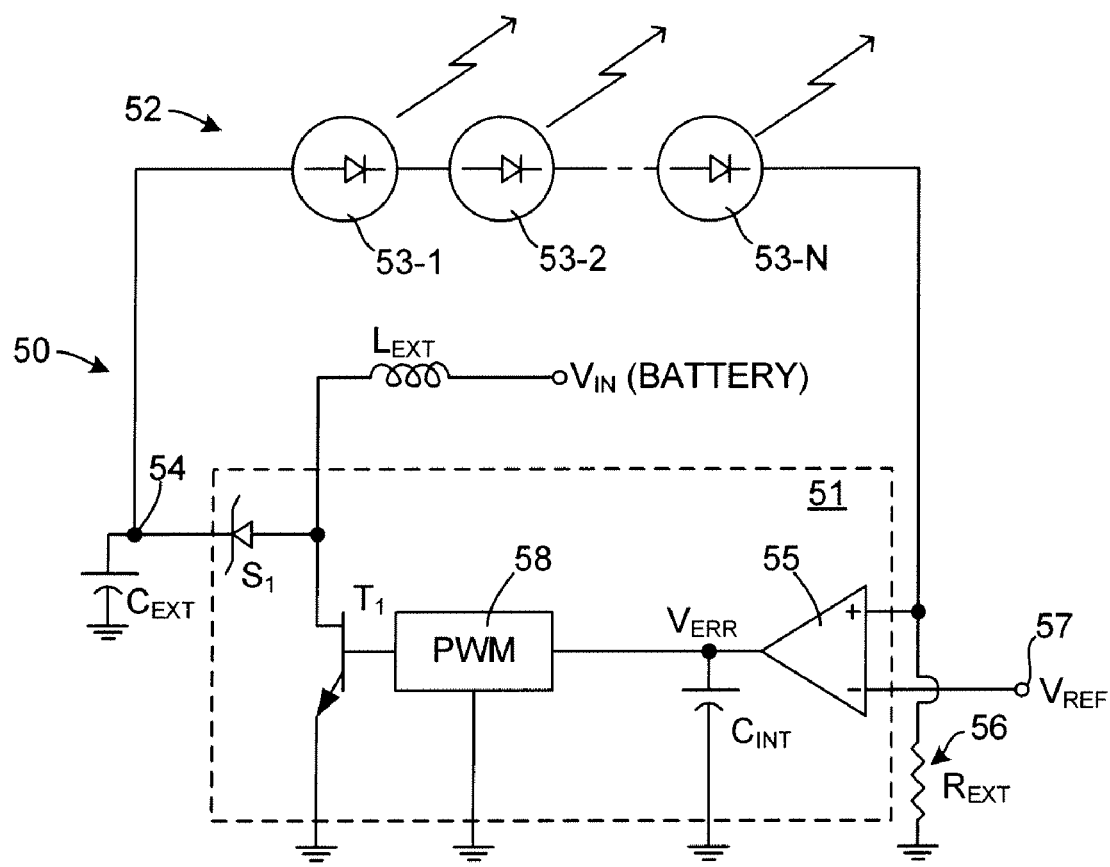
FIG. 4 is simplified circuit diagram showing a conventional LED driver circuit.

FIG. 3 is a simplified circuit diagram showing a LED driver circuit 100B according to another alternative embodiment of the present invention. LED driver circuit 100B is similar to the embodiment described above with reference to FIG. 1, but includes separate a output terminal 101-1 and shunt control terminal 101-2 to facilitate coupling external inductor $L_{EXT2}$ and external zener diode $S_{EXT}$ between output control circuit 110B and LED chain 102, and a power switch 140 that is controlled by constant current source 110B using known techniques. Note that, when enabled, shunt circuit 120 effectively couples output terminal 101-1 to feedback terminal 104 by way of inductor $L_{EXT2}$.

Although the present invention has been described with respect to certain specific embodiments, it will be clear to those skilled in the art that the inventive features of the present invention are applicable to other embodiments as well, all of which are intended to fall within the scope of the present invention. For example, it will be recognized by those skilled in the art that the methodology can be used to drive a single LED, or extended to a plurality of banks of LEDs of a variety of commercially available types and sizes. Moreover, the circuits described herein may be used to produce LED driver circuits that operate in conjunction with external LEDs and other components, and entire LED displays (i.e., without discrete external components, wherein the "terminals" of the LED driver circuits described above become "nodes" within the LED display).

The invention claimed is:

1. A Light-Emitting Diode (LED) driver circuit for controlling the brightness of light generated by a LED that is coupled between a first terminal and a second terminal of the LED driver circuit in response to an user supplied brightness control signal, said LED driver circuit comprising:

constant current means for generating a constant current between the first terminal and the second terminal when the first terminal is connected to an external voltage source;

shunt means connected between the first and second terminals; and brightness control means for generating a pulse signal having a duty cycle that is proportional to the user-supplied brightness control signal, wherein said shunt means is controlled by said pulse signal such that:

said shunt means closes when said pulse signal is at a first voltage level, whereby the constant current is passed through said shunt means and said first and second terminals are maintained at a substantially common voltage, and said shunt means opens when said pulse signal is at a second voltage level, whereby the constant current is passed from the first terminal to the second terminal through said LED.

2. The LED driver of claim 1, wherein the constant current means includes means for controlling a magnitude of said constant current in response to an user supplied color control signal.

3. The LED driver of claim 1, wherein the shunt means comprises a transistor having a first terminal coupled to the first terminal, a second terminal coupled to the second terminal, and a control terminal coupled to the brightness control means.

4. The LED driver of claim 3, wherein the transistor comprises an enhancement mode transistor and said brightness control means comprises a pulse width modulator (PWM) circuit.

5. A Light-Emitting Diode (LED) driver circuit for controlling the brightness of light generated by a LED that is coupled between a first terminal and a second terminal of the LED driver circuit in response to an user supplied brightness control signal, said LED driver circuit comprising:

a constant current source coupled to one of the first terminal and the second terminal;

a shunt transistor connected between the first and second terminals; and a brightness control circuit including means for generating a square-wave signal having a duty cycle that is proportional to the user-supplied brightness control signal, wherein a control terminal of the shunt transistor is coupled to receive the pulse signal generated by the brightness control circuit such that the shunt transistor is turned on and off to pass the constant current in accordance with a voltage level of the pulse signal.

6. The LED driver of claim 5, wherein the constant current source includes means for controlling a magnitude of said constant current in response to an user supplied color control signal.

7. The LED driver of claim 5, wherein the shunt transistor comprises an enhancement mode transistor and said brightness control circuit comprises a pulse width modulator (PWM) circuit.

8. A Light-Emitting Diode (LED) display comprising:
a LED coupled between a first node and a second node;
constant current means for generating a constant current between the first node and the second node;
shunt means connected between the first and second nodes in parallel with the LED; and brightness control means for generating a pulse signal having a duty cycle that is proportional to a brightness control signal,
wherein said shunt means is controlled by said pulse signal such that:
said shunt means closes when said pulse signal is at a first voltage level, whereby the constant current is passed through said shunt means and said first and second terminals are maintained at a substantially common voltage, and
said shunt means opens when said pulse signal is at a second voltage level, whereby the constant current is passed from the first terminal to the second terminal through said LED.

9. The LED display of claim 8, wherein the constant current means includes means for controlling a magnitude of said constant current in response to a user supplied color control signal.

10. The LED display of claim 8, wherein the shunt means comprises a transistor having a first terminal coupled to the first node, a second terminal coupled to the second node, and a control terminal coupled to the brightness control means.

11. The LED display of claim 8, wherein the transistor comprises an enhancement mode transistor and said brightness control means comprises a pulse width modulator (PWM) circuit.

* * * * *